(12) United States Patent
Liu et al.

(10) Patent No.: US 12,443,178 B2
(45) Date of Patent: Oct. 14, 2025

(54) MACHINE MONITORING SYSTEM AND MACHINE MONITORING METHOD

(71) Applicant: United Semiconductor (Xiamen) Co., Ltd., Fujian (CN)

(72) Inventors: Qun Feng Liu, Shamen (CN); Fujin Wang, Singapore (SG); Kai Ping Huang, Tainan (TW); Wen Yi Tan, Fujian (CN)

(73) Assignee: United Semiconductor (Xiamen) Co., Ltd., Fujian (CN)

( * ) Notice: Subject to any disclaimer, the term of this patent is extended or adjusted under 35 U.S.C. 154(b) by 254 days.

(21) Appl. No.: 18/104,777

(22) Filed: Feb. 1, 2023

(65) Prior Publication Data
US 2024/0184281 A1    Jun. 6, 2024

(30) Foreign Application Priority Data
Dec. 6, 2022    (CN) .......................... 202211553890.X (51) Int. Cl.
G06F 11/30    (2006.01)
G01M 99/00    (2011.01)
G05B 23/02    (2006.01)

(52) U.S. Cl.
CPC ....... *G05B 23/0283* (2013.01); *G01M 99/005* (2013.01)

(58) Field of Classification Search
CPC ................................................. G05B 23/0283
See application file for complete search history.

(56) References Cited

U.S. PATENT DOCUMENTS

2018/0239340 A1*    8/2018    Chen .................. G07C 3/14

FOREIGN PATENT DOCUMENTS

CN    10579748    *    7/2016

* cited by examiner

*Primary Examiner* — Phuong Huynh
(74) *Attorney, Agent, or Firm* — Winston Hsu (57) ABSTRACT

A machine monitoring system includes a plurality of first machines and a control module. The first machines are for a first process. The control module is connected with the first machines. The control module is configured to: define each of the first machines as a high-risk first machine or a low-risk first machine according to a first risk score of each of the first machines; designate one of the first machines being defined as the high-risk first machine as a selected high-risk first machine; assign an object to be processed by the first process through the selected high-risk first machine to obtain a processed object; and determine whether to continue or stop to use the selected high-risk first machine according to a test result of the processed object.

18 Claims, 9 Drawing Sheets

MACHINE MONITORING SYSTEM AND MACHINE MONITORING METHOD

BACKGROUND OF THE INVENTION

1. Field of the Invention

The present disclosure relates to a monitoring system and a monitoring method, and more particularly, to a machine monitoring system and a machine monitoring method.

2. Description of the Prior Art

In general, sampling inspection is often used to control product quality by production units. The sampling inspection is a statistical method and theory in which a small number of products (also known as samples) are randomly selected from a batch of products for inspection so as to determine whether the batch of products is qualified. The difference between the sampling inspection and a comprehensive inspection is that the latter needs to inspect the entire batch of products one by one to pick out the unqualified products, while the sampling inspection deduces the quality of the entire batch of products based on the inspection results of the samples. The sampling inspection has advantages of saving inspection fees and reducing inspection costs due to only a small number of products are inspected.

However, the risks existed in the machine itself is not considered by the sampling inspection. If one machine is abnormal and the abnormal machine is not involved in the process of sampling inspection, the abnormal machine cannot be detected at the first time. It is easy to continue to use the abnormal machine to produce products. Accordingly, a large number of unqualified products may be produced by the abnormal machine, which increases the production cost.

SUMMARY OF THE INVENTION

According to an embodiment of the present disclosure, a machine monitoring system includes a plurality of first machines and a control module. The first machines are for a first process. The control module is connected with the first machines. The control module is configured to: define each of the first machines as a high-risk first machine or a low-risk first machine according to a first risk score of each of the first machines; designate one of the first machines being defined as the high-risk first machine as a selected high-risk first machine; assign an object to be processed by the first process through the selected high-risk first machine to obtain a processed object; and determine whether to continue or stop to use the selected high-risk first machine according to a test result of the processed object.

According to another embodiment of the present disclosure, a machine monitoring method for monitoring a plurality of first machines for a first process is disclosed. The machine monitoring method includes steps as follows. Each of the first machines is defined as a high-risk first machine or a low-risk first machine according to a first risk score of each of the first machines. One of the first machines being defined as the high-risk first machine is designated as a selected high-risk first machine. An object is assigned to be processed by the first process through the selected high-risk first machine to obtain a processed object. Whether to continue or stop to use the selected high-risk first machine is determined according to a test result of the processed object.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part thereof, and in which is shown by way of illustration specific embodiments in which the disclosure may be practiced. In this regard, directional terminology, such as up, down, left, right, front, back, bottom, top, etc., is used with reference to the orientation of the Figure (s) being described. The components of the present disclosure can be positioned in a number of different orientations. As such, the directional terminology is used for purposes of illustration and is in no way limiting. In addition, identical numeral references or similar numeral references are used for identical components or similar components in the following embodiments.

It is understood that, although the terms first, second, etc. may be used herein to describe various components, regions, layers and/or sections, these components, regions, layers and/or sections should not be limited by these terms. These terms may be only used to distinguish one component, region, layer and/or section from another component, region, layer and/or section. Terms such as "first," "second," and other numerical terms when used herein do not imply a sequence or order unless clearly indicated by the context. Thus, a first component, region, layer and/or section discussed below could be termed a second component, region, layer and/or section without departing from the teachings of the embodiments. The terms used in the claims may not be identical with the terms used in the specification, but may be used according to the order of the components claimed in the claims.

In the present disclosure, for the description of "a component is connected with another component", it may refer that the connection between the two components are direct connection, indirect connection, wired connection or wireless connection. Thereby, the two components can transmit signals to each other. For example, the two components can transmit electrical energy or data, such as electric signals, magnetic signals and command signals.

Figure 1:
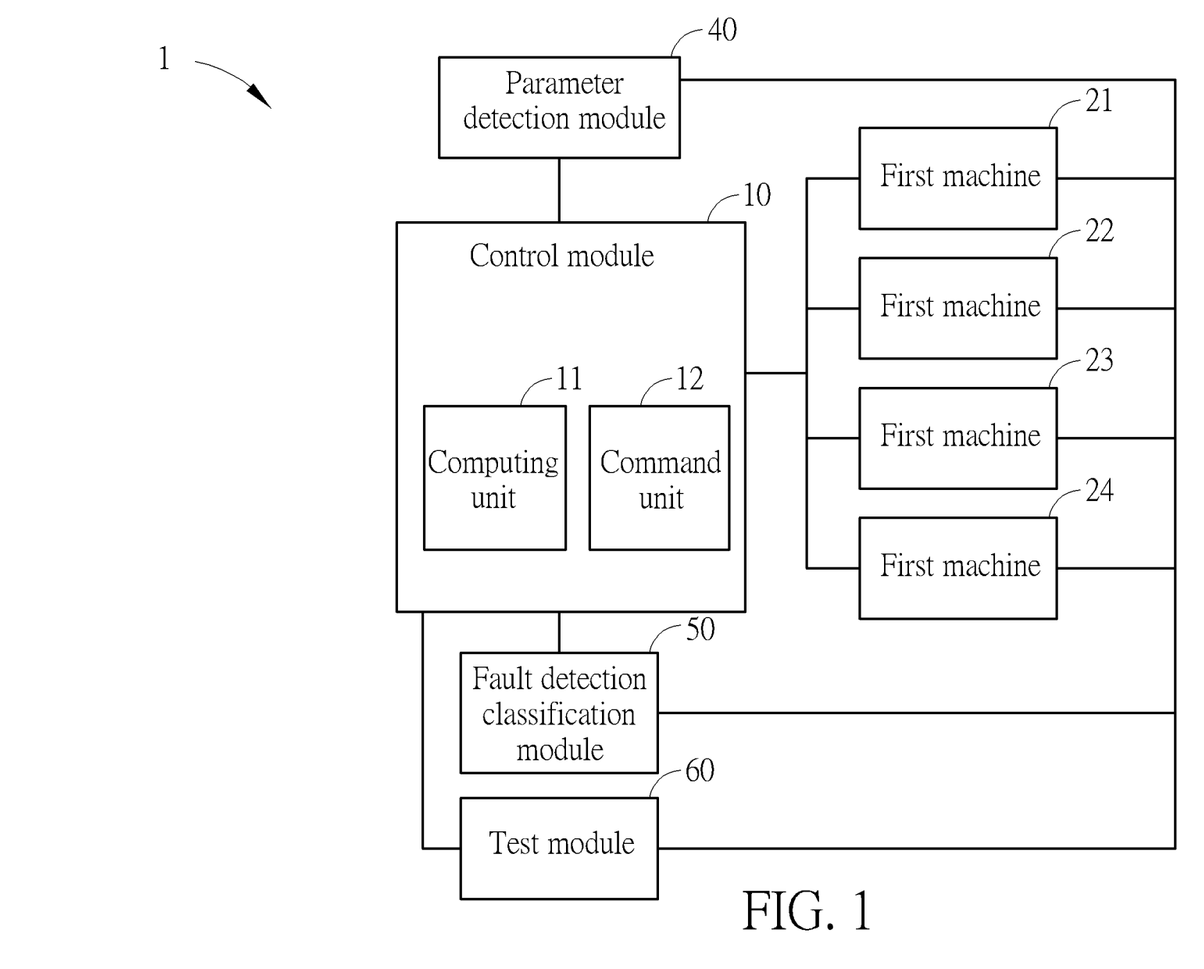
FIG. 1 is a functional block diagram of a machine monitoring system according to one embodiment of the present disclosure.

Please refer to FIG. 1, which is a functional block diagram of a machine monitoring system 1 according to one embodiment of the present disclosure. The machine monitoring system 1 includes a control module 10 and a plurality of first machines 21-24, and can optionally include a parameter detection module 40, a fault detection classification module 50 and a test module 60. The control module 10 is connected with the first machines 21-24, the parameter detection module 40, the fault detection classification module 50 and the test module 60.

The control module 10 has capability of analysis and calculation. The control module 10 can include, but is not limited to, a central processing unit (CPU). The control module 10 can be a server or a computer host. According to one embodiment of the present disclosure, the control module 10 can include a computing unit 11 and a command unit 12. The computing unit 11 is configured to analyze, calculate and provide commands. The command unit 12 is connected with the computing unit 11. The command unit 12 is configured to receive the commands provided by the computing unit 11 and provide the commands to the first machines 21-24. In some embodiments, the command unit 12 can also have capability of analysis and calculation. For example, the computing unit 11 and the command unit 12 can independently be a server or a computer host, and are connected with each other through an internet connection.

The first machines 21-24 are configured for a first process. For example, the first process can be a semiconductor process, and the first machines 21-24 can be semiconductor process devices. For More specific example, when the first process is a thin film deposition process, the first machines 21-24 can be chemical vapor deposition devices, physical vapor deposition devices, etc. When the first process is a lithography process, the first machines 21-24 can be exposure devices, developing devices, etc. In FIG. 1, the number of the first machines 21-24 is four, which is exemplary. The number of the first machines 21-24 can be adjusted according to practical needs. For the sake of convenience, the first process below is described as the semiconductor process. However, the present disclosure is not limited thereto. The first process can be a process other than the semiconductor process such as a food production process. As long as there are multiple first machines used for the first process, the machine monitoring system and the machine monitoring method according to the present disclosure are applicable thereto.

The parameter detection module 40 is connected with the first machines 21-24 and the control module 10. The parameter detection module 40 is configured to collect parameters of the first machines 21-24, such as temperature, gas flow, gas pressure, etc. According to one embodiment of the present disclosure, the parameter detection module 40 can include a plurality of sensors (not shown) disposed on the first machines 21-24 for detecting the parameters of the first machines 21-24. Thereby, the parameter detection module 40 can collect the parameters of each of the first machines 21-24 and can send the parameters to the control module 10.

The fault detection classification module 50 is connected with the first machines 21-24 and the control module 10. The fault detection classification module 50 is configured to collect abnormal data of the first machines 21-24. For example, when each of the first machines 21-24 includes a vacuum chamber, the abnormal data may indicate that the time for opening or closing a door of the vacuum chamber is excessive long or a valve cannot be closed normally. According to one embodiment of the present disclosure, the fault detection classification module 50 may include a plurality of sensors (not shown) disposed on the first machines 21-24 for detecting the abnormal data of the first machines 21-24. Thereby, the fault detection classification module 50 can collect the abnormal data of the first machines 21-24 and can send the abnormal data to the control module 10. In the embodiment, the machine monitoring system 1 includes the parameter detection module 40 and the fault detection classification module 50 at the same time. However, the present disclosure is not limited thereto. In some embodiments, the machine monitoring system 1 may only include one of the parameter detection module 40 and the fault detection classification module 50. Alternatively, in some embodiments, the parameter detection module 40 and the fault detection classification module 50 can be integrated into a single module which can collect the parameters and the abnormal data of the first machines 21-24.

The test module 60 is connected with the control module 10. The test module 60 is configured to test a property of the processed object applied with the first process so as to obtain a test result of the processed object and send the test result to the control module 10. The test module 60 can be optionally connected with the first machines 21-24, which is favorable for the test module 60 to receive the processed object after completing the first process through the first machines 21-24. The aforementioned test result can include a number of impurities and/or defects on a surface of the processed object, such as scratches, scrape marks, etc. In this case, the test module 60 can be an optical microscope and an electron microscope, such as a scanning electron microscope (SEM) and a transmission electron microscope (TEM). However, the present disclosure is not limited thereto. The type of the test module 60 can be adjusted according to the required properties of the processed object, so as to obtain the corresponding test result to ensure that the quality of the processed object can meet the requirements.

Figure 2:
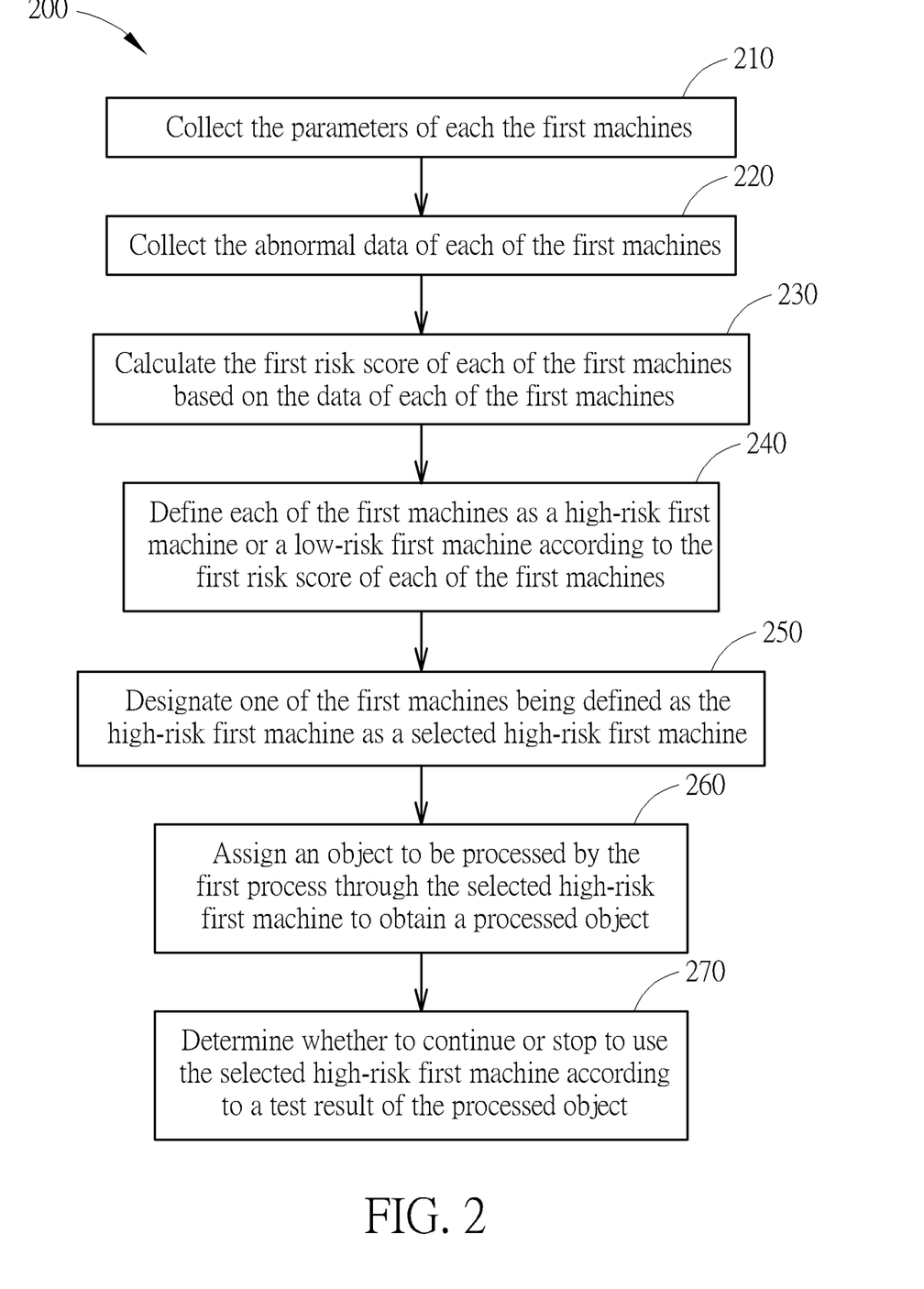
FIG. 2 is a flow diagram showing a machine monitoring method according to one embodiment of the present disclosure.

FIG. 2 is a flow diagram showing a machine monitoring method 200 according to one embodiment of the present disclosure. The machine monitoring method 200 includes Steps 240-270, and can optionally include Steps 210-230. Specifically, the control module 10 of the machine monitoring system 1 is configured to perform the steps of the machine monitoring method 200 (i.e., Steps 210-270).

Step 240 is to define each of the first machines 21-24 as a high-risk first machine or a low-risk first machine according to a first risk score of each of the first machines 21-24. Step 250 is to designate one of the first machines being defined as the high-risk first machine as a selected high-risk first machine. Step 260 is to assign an object to be processed by the first process through the selected high-risk first machine to obtain a processed object. Step 270 is to determine whether to continue or stop to use the selected high-risk first machine according to a test result of the processed object.

Before performing Step 240, Step 230 may be performed first. Step 230 is to calculate the first risk score of each of the first machines 21-24 based on the data of each of the first machines 21-24. The computing unit 11 of the control module 10 can be configured to calculate the first risk score of each of the first machines 21-24 based on the data of each of the first machines 21-24 and designate the selected high-risk first machine. The command unit 12 of the control module 10 is configured to assign the object to be processed by the first process through the selected high-risk first machine to obtain the processed object. The data of each of the first machines 21-24 can include a selected frequency, an estimated remaining life, the parameters, the abnormal data, an off-line impurity detection result and/or a design complexity of each of the first machines 21-24.

The selected frequency can be the frequency that each of the first machines 21-24 is selected to perform the first process in the most recent period, and the selected frequency can be the number of times that each of the first machines 21-24 is selected to perform the first process within a certain time period. For example, the selected frequency can be the number of times that each of the first machines 21-24 is selected to perform the first process in the most recent day, and the unit is "times/day". For another example, the selected frequency can be the number of times that each of the first machines 21-24 is selected to perform the first process in the most recent month, and a the unit is "times/month". The aforementioned certain time period can be adjusted according to practical needs such as the time required by the first process. When the selected frequency is higher, the number of times that the first machine 21-24 is monitored in the most recent period is higher, and the risk is lower.

The estimated remaining life is the average service life of each of the first machines 21-24 minus the time that each of the first machines 21-24 has been used. For example, when the average service life of each of the first machines 21-24 is 36 months, and the first machine 21 has been used for 12 months, the estimated remaining life of the first machine 21 is 24 months. When the estimated remaining life is longer, the risk is lower.

The parameters can be the parameters collected when each of the first machines 21-24 performed the first process within a certain time period in the past. For example, the parameters can be collected through the parameter detection module 40. When the parameters exceed the preset parameter ranges, and the number of times exceeding the preset parameter range or the extents exceeding the preset parameter range is higher, the risk is higher.

The abnormal data can be the abnormal data collected when each of the first machines 21-24 performed the first process within a certain time period in the past. For example, the abnormal data can be collected through the fault detection classification module 50. When the number of times that the abnormal data are collected or the abnormal degree is more serious, the risk is higher.

The off-line impurity detection result can be the number of particles increased on a surface of a control wafer or a dummy wafer which is not a product after the control wafer or the dummy wafer is processed by the first process through each of the first machines 21-24 within a certain period of time in the past. When the number of particles increased on the surface of the control wafer or the dummy wafer is larger, the impurity is higher, and the yield of the subsequent process is more easily affected. Therefore, when the number of particles increased on the surface of the control wafer or the dummy wafer is lager, the risk is higher.

The design complexity refers to the design complexity of each of the first machines 21-24 or the tolerance for the variation of process conditions or the probability of failure based on the design complexity thereof. When the design complexity of each of the first machines 21-24 is higher, the tolerance for the variation of process conditions is lower and/or the probability of failure is higher, the risk is higher. In other words, the design complexity is related to the type and the model of each of the first machines 21-24. For example, the design complexity of an exposure device is different from that of a chemical vapor deposition device. Moreover, the exposure devices made by different manufacturers or the exposure devices of different models manufactured by the same manufacturer may have different design complexity. In some embodiments, when the types and the models of the first machines 21-24 are the same, the design complexities of the first machines 21-24 are the same. In some embodiments, when the types of the first machines 21-24 are the same, and the models of the first machines 21-24 are different, the design complexities of the first machines 21-24 are different.

In the embodiment, the first risk score of each of the first machines 21-24 is calculated and obtained by the control module 10 based on the data of each of the first machines 21-24. However, in other embodiments, the first risk score can be calculated and obtained by another computing module (not shown) and sent to the control module 10, and thus Step 230 can be omitted. Alternatively, the first risk score of each of the first machines 21-24 can be updated at a fixed time. For example, the first risk score of each of the first machines 21-24 can be updated at 12 o'clock noon every day. Step 230 is performed only when the update is performed. When the update is not performed, Step 230 is omitted and the original first risk score is used.

When the data of the first machines 21-24 include the parameters and the abnormal data, the machine monitoring method 200 can further include Step 210 and Step 220. Step 210 is to collect the parameters of each the first machines 21-24. Step 220 is to collect the abnormal data of each of the first machines 21-24. In other words, the control module 10 can be further configured to control the parameter detection module 40 to collect the parameters of each of the first machines 21-24 and control the fault detection classification module 50 to collect the abnormal data of each of the first machines 21-24, such that the parameters and the abnormal data can be used as the bases for calculating the first risk score. Before performing Step 270, the control module 10 can be further configured to control the test module 60 to test the properties of the processed object to obtain the test result.

Herein, a specific example is provided to illustrate how to calculate the first risk score. In the embodiment, the risk scores of the first item N1 to the sixth item N6 are provided according to the selected frequency A1, the estimated remaining life A2, the parameters A3, the abnormal data A4, the off-line impurity detection result A5 and the design complexity A6, respectively. The scoring standards are shown in Table 1. When the selected frequency A1 is equal to 0 times/month, the risk score of the first item N1 is equal to 5 points. When the selected frequency A1 is greater than or equal to 1 time/month and less than 2 times/month, the risk score of the first item N1 is equal to 4 points, and so on. Moreover, the parameters A3 can be the number of times that the parameters exceed the preset parameter range within the past month. The abnormal data A4 can be the number of times that the abnormal data are collected within the past month. The off-line impurity detection result A5 can be the number of particles increased on a surface of a control wafer which is not a product after the control wafer is processed by the first process through each of the first machines 21-24 within the past month. The scores of the design complexity A6 are given according to the models M1-M5.

TABLE 1

| A1 (times/month) | A1 ≥ 7 | 5 ≤ A1 ≤ 6 | 3 ≤ A1 ≤ 4 | 1 ≤ A1 ≤ 2 | A1 = 0 |
|---|---|---|---|---|---|
| N1 (points) | 1 | 2 | 3 | 4 | 5 |
| A2 (months) | 24 < A2 | 18 < A2 ≤ 24 | 12 < A2 ≤ 18 | 6 < A2 ≤ 12 | A2 ≤ 6 |
| N2 (points) | 1 | 2 | 3 | 4 | 5 |
| A3 (number of times) | A3 = 0 | 1 ≤ A3 ≤ 3 | 4 ≤ A3 ≤ 6 | 7 ≤ A3 ≤ 9 | A3 ≥ 10 |
| N3 (points) | 1 | 2 | 3 | 4 | 5 |
| A4 (number of times) | A4 = 0 | 1 ≤ A4 ≤ 3 | 4 ≤ A4 ≤ 6 | 7 ≤ A4 ≤ 9 | A4 ≥ 10 |
| N4 (points) | 1 | 2 | 3 | 4 | 5 |
| A5 (number of particles) | A5 = 0 | 1 ≤ A5 ≤ 5 | 6 ≤ A5 ≤ 10 | 11 ≤ A5 ≤ 15 | A5 ≥ 16 |
| N5 (points) | 1 | 2 | 3 | 4 | 5 |
| A6 | M1 | M2 | M3 | M4 | M5 |
| N6 (points) | 1 | 2 | 3 | 4 | 5 |

In the embodiment, the first risk score N is a mean of the risk score of the first item N1 to the risk score of the sixth item N6. When the first risk score N is less than or equal to 3 points, the first machine is defined as a low-risk first machine. When the first risk score N is greater than 3 points, the first machine is defined as a high-risk first machine. In the case, the proportions of the risk score of the first item N1 to the risk score of the sixth item N6 in the first risk score N are the same. However, the present disclosure is not limited thereto. The proportions of the risk score of the first item N1 to the risk score of the sixth item N6 in the first risk score N can be adjusted according to practical needs, such as the types of the first machines. Mover, the score to distinguish the low-risk first machine and the high-risk first machine can be adjusted adaptively.

In the embodiment, the control module 10 performs Step 230. The control module 10 calculates to obtain the risk score of the first item N1 to the risk score of the sixth item N6 of each of the first machines 21-24 based on the data of the first machines 21-24 shown in Table 2 and the scoring standards shown in Table 1, and the control module 10 further calculates to obtain the first risk score N shown in Table 3 according to the risk score of the first item N1 to the risk score of the sixth item N6.

TABLE 2

| | A1 (times/month) | A2 (months) | A3 (number of times) | A4 (number of times) | A5 (number of particles) | A6 |
|---|---|---|---|---|---|---|
| first machine 21 | 8 | 25 | 2 | 0 | 0 | M1 |
| first machine 22 | 0 | 10 | 12 | 10 | 20 | M5 |
| first machine 23 | 7 | 15 | 7 | 6 | 12 | M4 |
| first machine 24 | 9 | 30 | 2 | 1 | 0 | M1 |

TABLE 3

(Unit: points)

| | N1 | N2 | N3 | N4 | N5 | N6 | N |
|---|---|---|---|---|---|---|---|
| first machine 21 | 1 | 1 | 2 | 1 | 1 | 1 | 1.2 |
| first machine 22 | 5 | 4 | 5 | 5 | 5 | 5 | 4.8 |
| first machine 23 | 1 | 3 | 4 | 3 | 4 | 4 | 3.2 |
| first machine 24 | 1 | 1 | 2 | 2 | 1 | 1 | 1.3 |

Next, the control module 10 performs Step 240, i.e., the control module 10 defines the first machines 21 and 24 as the low-risk first machines (the first risk score N is less than or equal to 3 points) and defines the first machines 22 and 23 as the high-risk first machines (the first risk score N is greater than 3 points). Next, the control module 10 performs Step 250, i.e., the control module 10 designates one of the first machines 22 and 23 as the selected high-risk first machine. Herein, the first machine 22 is exemplarily designated as the selected high-risk first machine. Next, the control module 10 performs Step 260, i.e., the control module 10 assigns an object to be processed by the first process through the selected high-risk first machine (i.e., the first machine 22) to obtain a processed object. Afterward, the control module 10 performs Step 270, i.e., the control module 10 determines whether to continue or stop to use the selected high-risk first machine (i.e., the first machine 22) according to the test result of the processed object.

In the embodiment, the sum of the number of impurities and the number of defects on the surface of the processed object can be used as the test result. When the sum of the number of impurities and the number of defects is greater than or equal to 10, it represents that the processed object is an unqualified product. At this time, the control module 10 determines to stop to use the first machine 22 and check the first machine 22 for subsequent repair, maintenance or scrapping. When the sum of the number of impurities and the number of defects is less than 10, it represents that the processed object is a qualified product. At this time, the control module 10 determines to continue to use the first machine 22 for production. The aforementioned scoring standards for the risk score of the first item N1 to the risk score of the sixth item N6, and the standard of the test result for determining whether to continue or stop to use the first machine are exemplarily, and can be adaptively adjusted according to actual situations, such as the type of the processed object, the type of the first process, etc.

Figure 3:
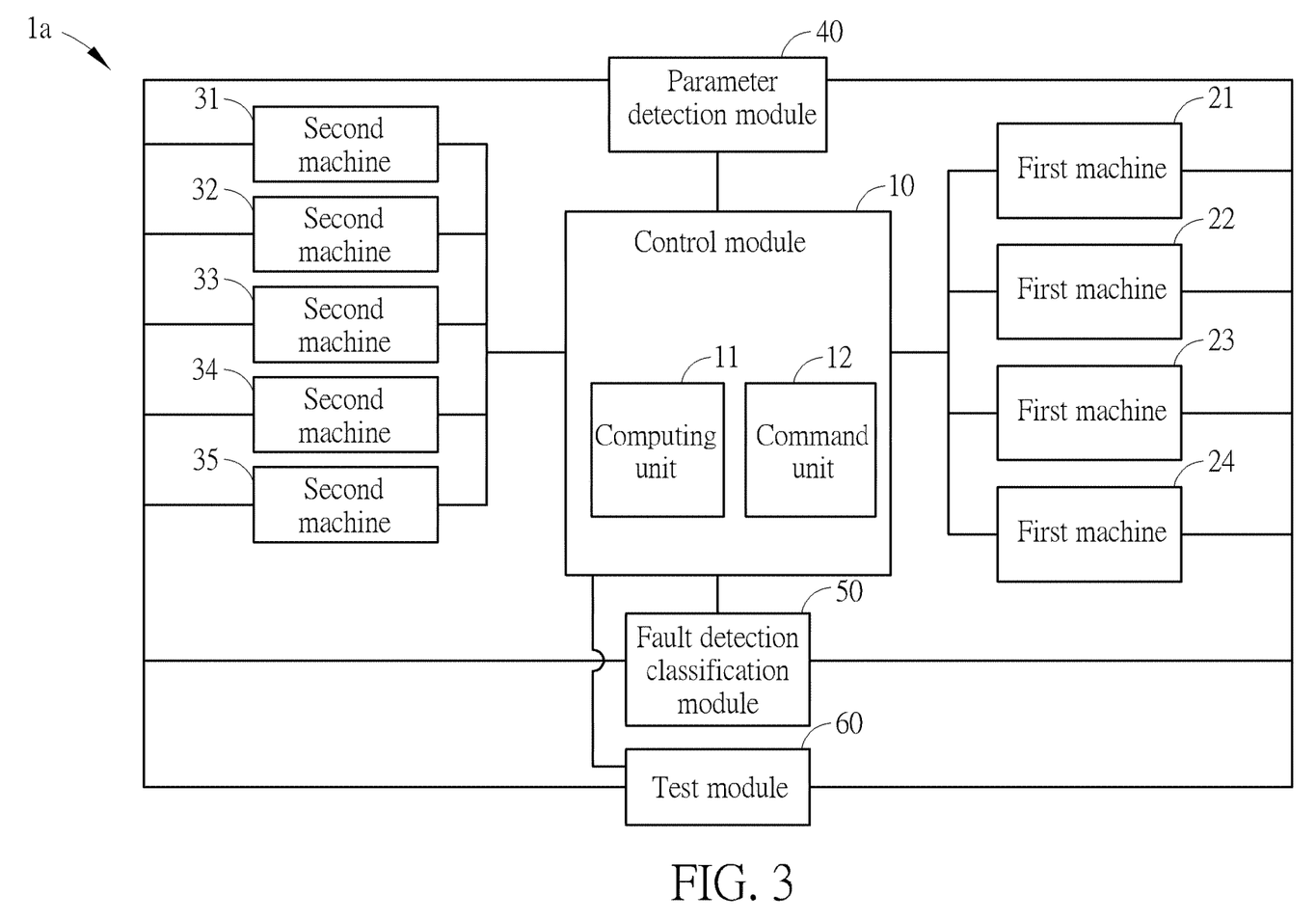
FIG. 3 is a functional block diagram of a machine monitoring system according to another embodiment of the present disclosure.

Please refer to FIG. 3, which is a functional block diagram of the machine monitoring system 1a according to another embodiment of the present disclosure. The difference between the machine monitoring system 1a and the machine monitoring system 1 is that the machine monitoring system 1a further includes a plural of second machines 31-35. The control module 10 is connected with the second machines 31-35.

The second machines 31-35 are for a second process. The second process is different from the first process. The type of the second machines 31-35 is different from that of the first machines 21-24. For example, the first process and the second process can be different semiconductor processes, such as two of the thin film deposition process, lithography process, grinding process, diffusion process and etching process. The first machines 21-24 and the second machines 31-35 are the semiconductor devices corresponding to the two semiconductor processes. In FIG. 3, the number of the first machines 21-24 is four, and the number of the second machines 31-35 is five. However, it is only exemplarily. The numbers of the first machines 21-24 and the second machines 31-35 can be adjusted according to practical needs.

The parameter detection module 40 can be further connected with the second machines 31-35 and configured to collect parameters of the second machines 31-35. According to one embodiment of the present disclosure, the parameter detection module 40 can include a plurality of sensors (not shown) disposed on the second machines 31-35 for detecting the parameters of the second machines 31-35. Thereby, the parameter detection module 40 can collect the parameters of each of the second machines 31-35 and send the parameters to the control module 10.

The fault detection classification module 50 can be further connected with the second machines 31-35 and configured to collect abnormal data of the second machines 31-35. According to one embodiment of the present disclosure, the fault detection classification module 50 may include a plurality of sensors (not shown) disposed on the second machines 31-35 for detecting the abnormal data of the second machines 31-35. Thereby, the fault detection classification module 50 can collect the abnormal data of the second machines 31-35 and send the abnormal data to the control module 10. For other details of the machine monitoring system 1a, references may be made to the machine monitoring system 1 and are omitted herein.

Figure 4:
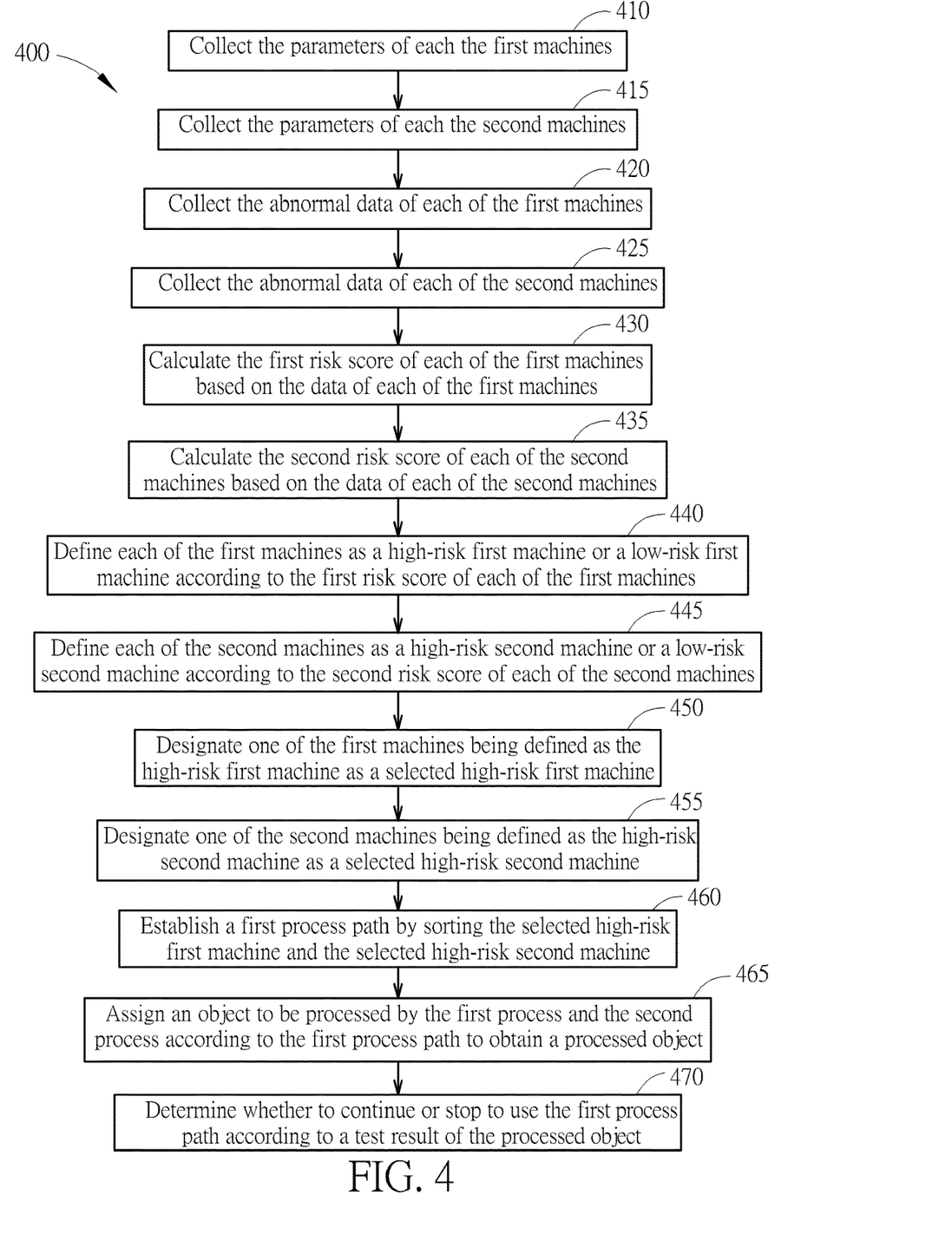
FIG. 4 is a flow diagram showing a machine monitoring method according to another embodiment of the present disclosure.

Please refer to FIG. 4, which is a flow diagram showing a machine monitoring method 400 according to another embodiment of the present disclosure. The machine monitoring method 400 includes Steps 440-470, and can optionally include Steps 410-435. Specifically, the control module 10 is configured to perform steps of the machine monitoring method 400 (i.e., Steps 410-470).

Step 440 is to define each of the first machines 21-24 as a high-risk first machine or a low-risk first machine according to a first risk score of each of the first machines 21-24. Step 445 is to define each of the second machines 31-35 as a high-risk second machine or a low-risk second machine according to a second risk score of each of the second machines 31-35. Step 450 is to designate one of the first machines being defined as the high-risk first machine as a selected high-risk first machine. Step 455 is to designate one of the second machines being defined as the high-risk second machine as a selected high-risk second machine. Step 460 is to establish a first process path by sorting the selected high-risk first machine and the selected high-risk second machine. Step 465 is to assign an object to be processed by the first process and the second process according to the first process path to obtain a processed object. Step 470 is to determine whether to continue or stop to use the first process path according to the test result of the processed object.

Before performing Step 440, Step 430 and Step 435 may be performed first. Step 430 is to calculate the first risk score of each of the first machines 21-24 based on the data of each of the first machines 21-24. Step 435 is to calculate the second risk score of each of the second machines 31-35 based on the data of each of the second machines 31-35. When the data of the first machines 21-24 and the second machines 31-35 include the parameters and the abnormal data, the machine monitoring method 400 can further include Steps 410-425. Step 410 is to collect the parameters of each the first machines 21-24. Step 415 is to collect the parameters of each the second machines 31-35. Step 420 is to collect the abnormal data of each of the first machines 21-24. Step 425 is to collect the abnormal data of each of the second machines 31-35. In other words, the control module 10 can be further configured to control the parameter detection module 40 to collect the parameters of each of the first machines 21-24 and each of the second machines 31-35 and control the fault detection classification module 50 to collect the abnormal data of each of the first machines 21-24 and each of the second machines 31-35, such that the parameters and the abnormal data can be used as the bases for calculating the first risk score and the second risk score. For details relating to how to obtain the first risk score and the second risk score, how to define the high-risk first machine, the low-risk first machine, the high-risk second machine, the low-risk second machine, reference may be made the above descriptions related to FIG. 2, Table 1 to Table 3 and are omitted herein.

Figure 5:
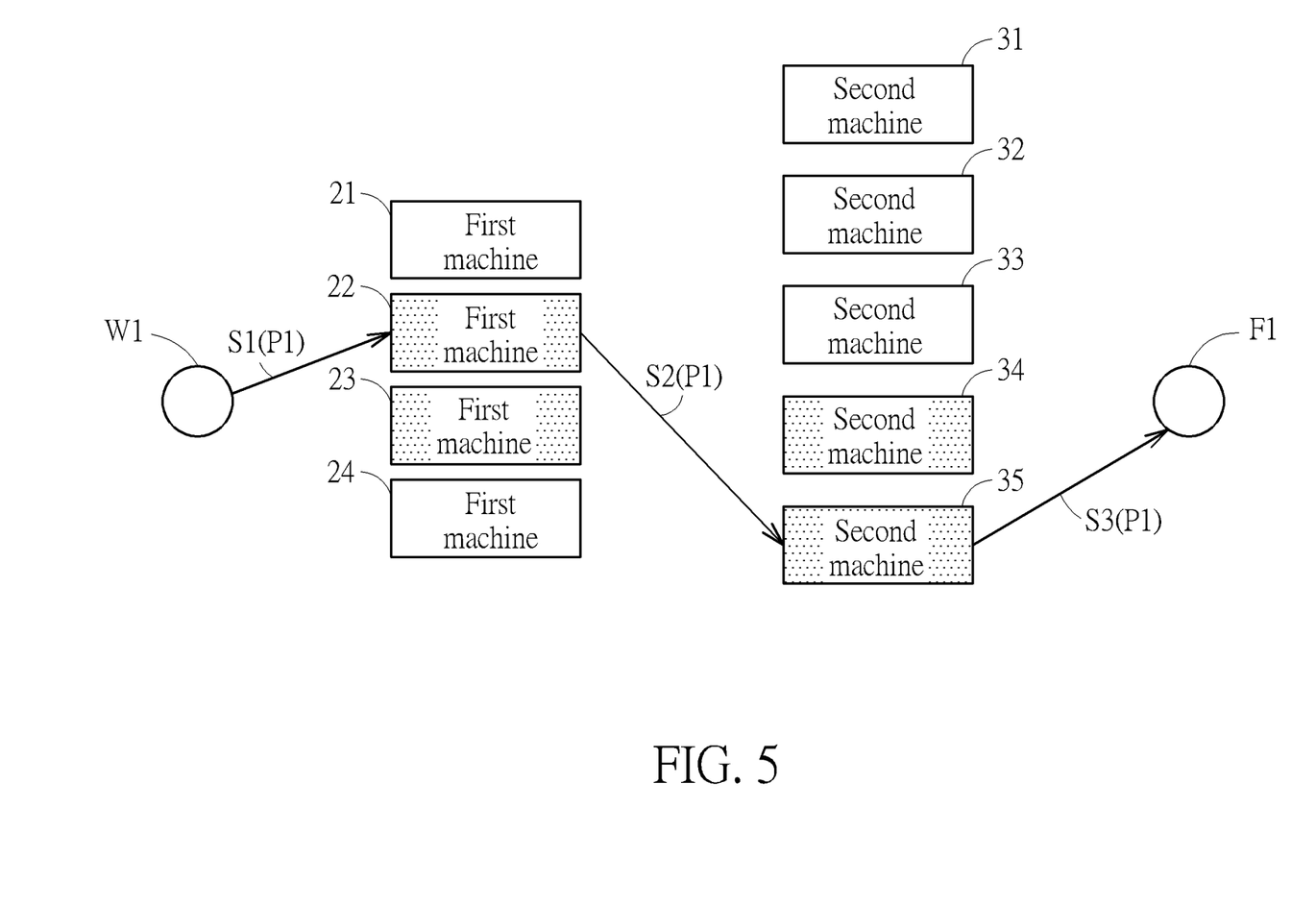
FIG. 5 is a schematic diagram of a first process path according to one embodiment of the present disclosure.

Please refer to FIG. 5, which is a schematic diagram of a first process path P1 according to one embodiment of the present disclosure, in which the machines with high risk are sprinkled with dots for legibility. In the embodiment, after the control module 10 performs Step 440, the first machines 21 and 24 are defined as the low-risk first machines, and the first machines 22, 23 are defined as the high-risk first machines. After the control module 10 performs Step 445, the second machines 31, 32, and 33 are defined as the low-risk second machines, and the second machines 34 and 35 are defined as the high-risk second machines. The control module 10 performs Step 450 to designate one of the first machines 22 and 23 as the selected high-risk first machine. Herein, the first machine 22 is exemplarily designated as the selected high-risk first machine. The control module 10 performs Step 455 to designate one of the second machines 34 and 35 as the selected high-risk second machine. Herein, the second machine 35 is exemplarily designated as the selected high-risk second machine. The control module 10 performs Step 460 to establish a first process path P1 by sorting the first machine 22 and the second machine 350. Herein, the first process path P1 is first to process with the first machine 22 and then to process with the second machine 35. The control module 10 performs Step 465 to assign the object W1 to be processed by the first process and the second process according to the first process path P1. As shown in Arrow S1, the object W1 is sent to the first machine 22 to be processed by the first process. As shown in Arrow S2, the object W1 is then sent from the first machine 22 to the second machine 35 to be processed the second process. As shown in Arrow S3, the object W1 is taken away from the second machine 35 after the second process is completed and the processed object F1 transformed from the object W1 is obtained. That is, the first process path P1 includes the path formed by Arrow S1, Arrow S2 and Arrow S3. In other embodiments, the first process path P1 can be first to process with the second machine 35 and then to process with the first machine 22. Alternatively, the first process path P1 can repeatedly process with the first machine 22 and the second machine 35 in sequence. That is, the first process path P1 can be established depending on the requirements for the product. Afterward, the control module 10 performs Step 470 to determine whether to continue or stop to use the first process path P1 according to the test result of the processed object F1. For the standard of the test result, reference may be made to the above descriptions related to FIG. 2, Table 1 to Table 3, and are not repeated herein.

When the test result shows that the processed object F1 is an unqualified product, it means that at least one of the first machine 22 and the second machine 35 is abnormal. In this case, the machine monitoring method 400 can further include Step 510 to Step 540 (as shown in FIG. 6), or, the machine monitoring method 400 can further include Step 610 to Step 640 (as shown in FIG. 8), so as to determine which of the first machine 22 and the second machine 35 is abnormal.

Figure 6:
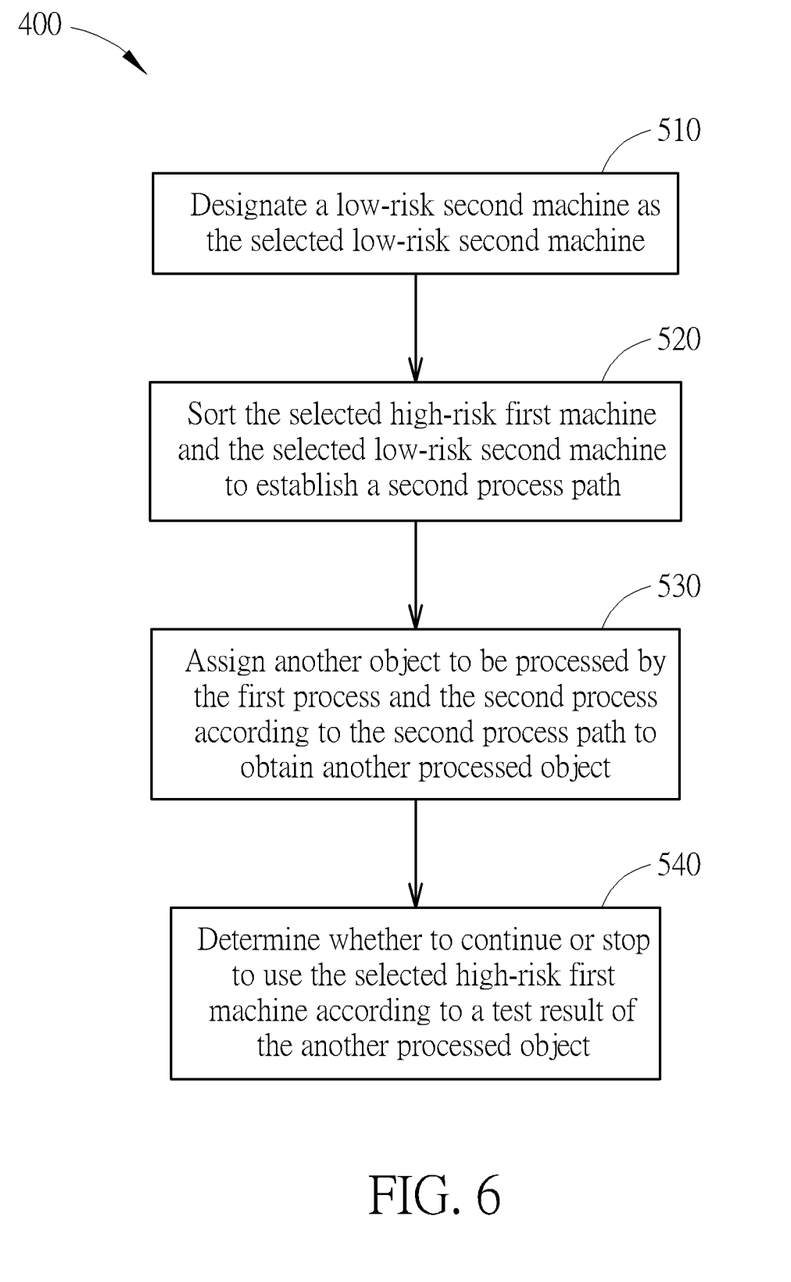
FIG. 6 is a flow diagram showing the machine monitoring method according to one embodiment of the present disclosure.

Please refer to FIG. 6, which is a flow diagram showing the machine monitoring method 400 according to one embodiment of the present disclosure, which can be performed after Step 470 of FIG. 5. When the control module 10 determines to stop to use the first process path in Step 470, the control module 10 can further perform Step 510 to Step 540. Step 510 is to designate a low-risk second machine as the selected low-risk second machine. Step 520 is to sort the selected high-risk first machine and the selected low-risk second machine to establish the second process path. Step 530 is to assign another object to be processed by the first process and the second process according to the second process path to obtain another processed object. Step 540 is to determine whether to continue or stop to use the selected high-risk first machine according to the test result of the another processed object.

Figure 7:
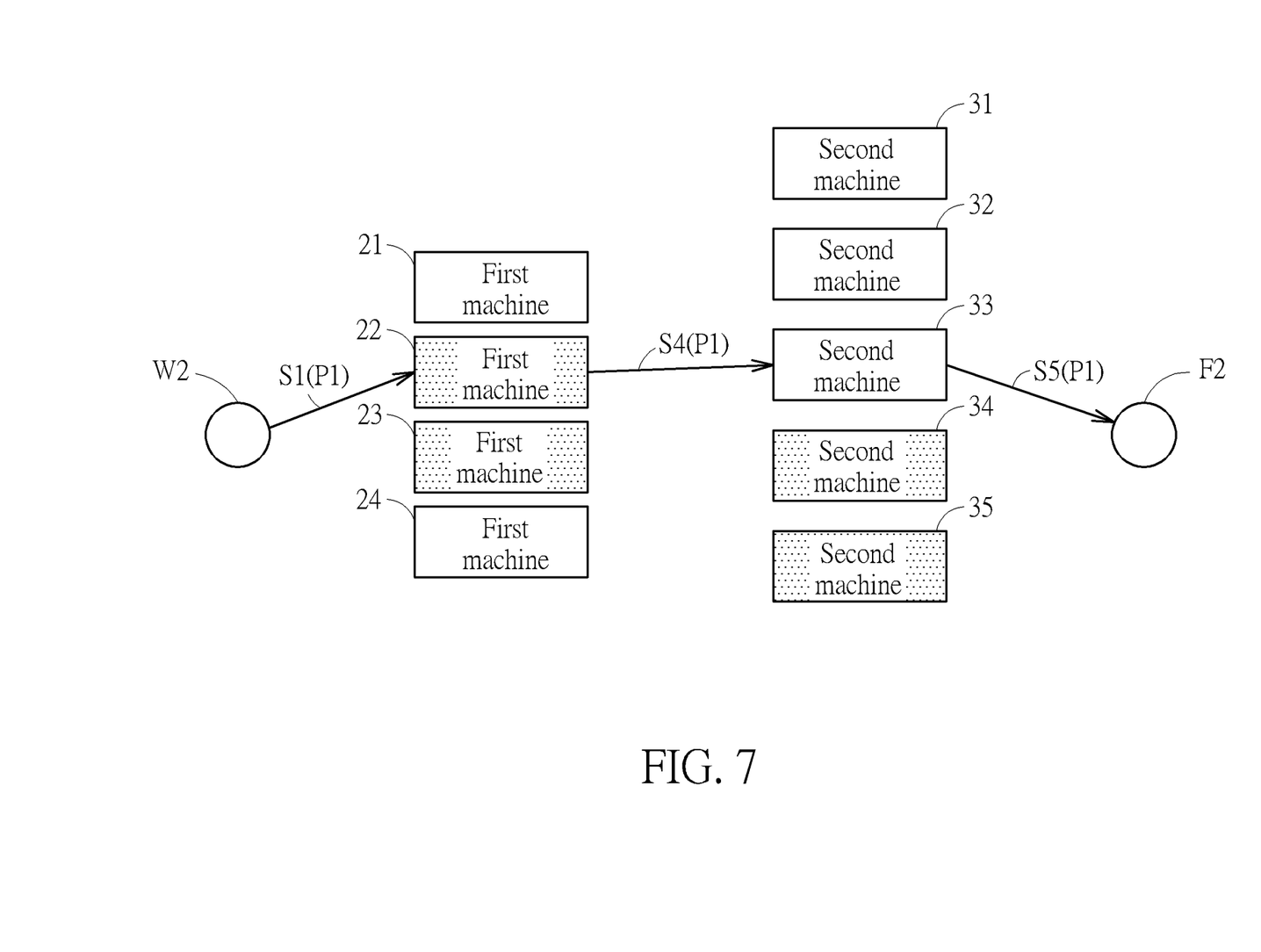
FIG. 7 is a schematic diagram of a second process path according to one embodiment of the present disclosure.

Please refer to FIG. 7, which is a schematic diagram of a second process path P2 according to one embodiment of the present disclosure. Herein, FIG. 7 is used to illustrate Steps 510-540 in FIG. 6, which is exemplary and the present disclosure is not limited thereto. The control module 10 performs Step 510 to designate one of the low-risk second machines 31, 32, and 33 as the selected low-risk second machine. Herein, the second machine 33 is exemplarily designated as the selected low-risk second machine. The control module 10 performs Step 520 to sort the first machine 22 and the second machine 33 to establish the second process path P2. Herein the second process path P2 is first to process with the first machine 22 and then to process with the second machine 33. The control module 10 performs Step 530 to assign another object W2 to be processed by the first process and the second process according to the second process path P2, so as to obtain another processed object F2. That is, the second process path P2 includes the path formed by Arrow S1, Arrow S4 and Arrow S5. The control module 10 performs Step 540 to determine whether to continue or stop to use the first machine 22 according to the test result of the another processed object F2. Specifically, the second process path P2 includes the first machine 22 with higher risk and the second machine 33 with lower risk. When the test result of the processed object F2 is qualified, it refers that the first machine 22 and the second machine 33 are not abnormal. Thus, the control module can determine to continue to use the first machine 22. In addition, it can be exclude the possibility that the abnormality of the first process path P1 in FIG. 5 is caused by the first machine 22. In other words, it can be deduced that the abnormality of the first process path P1 in FIG. 5 is likely caused by the second machine 35. At this time, the control module 10 can determine to stop to use the second machine 35, or to perform Steps 610-640 in FIG. 8 to further confirm whether the second machine 35 is abnormal. When the test result of the processed object F2 is unqualified, it means that the first machine 22 is likely abnormal because the second machine 33 has a lower risk. The control module 10 can determine to stop to use the first machine 22. In addition, the first machine 22 being regarded as abnormal cannot exclude the abnormality of the second machine 35 (because the abnormality of the first process path P1 may be caused by the abnormalities of the first machine 22 and the second machine 35 at the same time), and Step 610 to Step 640 in FIG. 8 are still required to be performed for further confirming whether the second machine 35 is abnormal.

Figure 8:
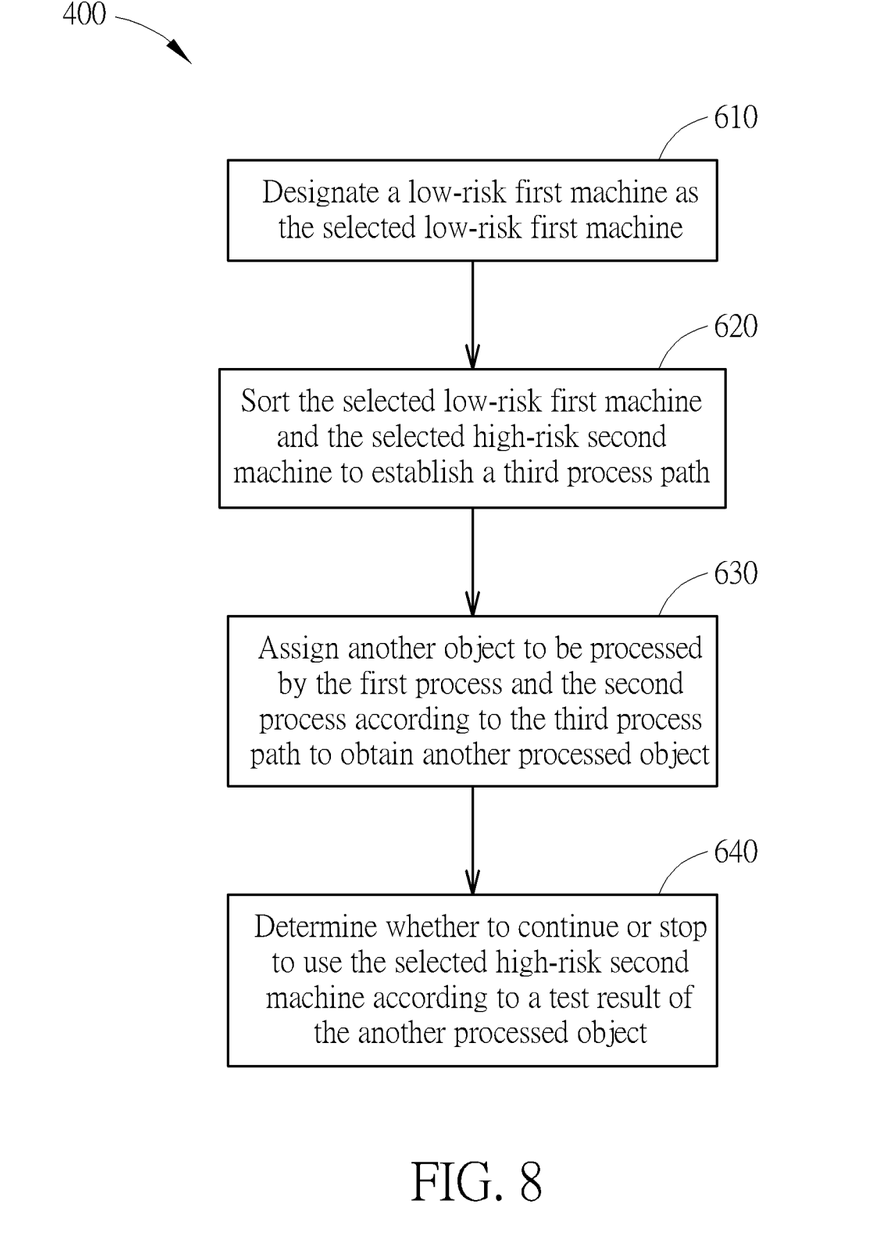
FIG. 8 is a flow diagram showing the machine monitoring method according to the one embodiment of the present disclosure.

Please refer to FIG. 8, which is a flow diagram showing the machine monitoring method 400 according to one embodiment of the present disclosure, which can be performed after Step 470 of FIG. 5 or after Step 540 of FIG. 6. When the control module 10 determines to stop to use the first process path in Step 470, the control module 10 can further perform Steps 610-640. Step 610 is to designate a low-risk first machine as the selected low-risk first machine. Step 620 is to sort the selected low-risk first machine and the selected high-risk second machine to establish a third process path. Step 630 is to assign another object to be processed by the first process and the second process according to the third process path to obtain another processed object. Step 640 is to determine whether to continue or stop to use the selected high-risk second machine according to the test result of the another processed object.

Figure 9:
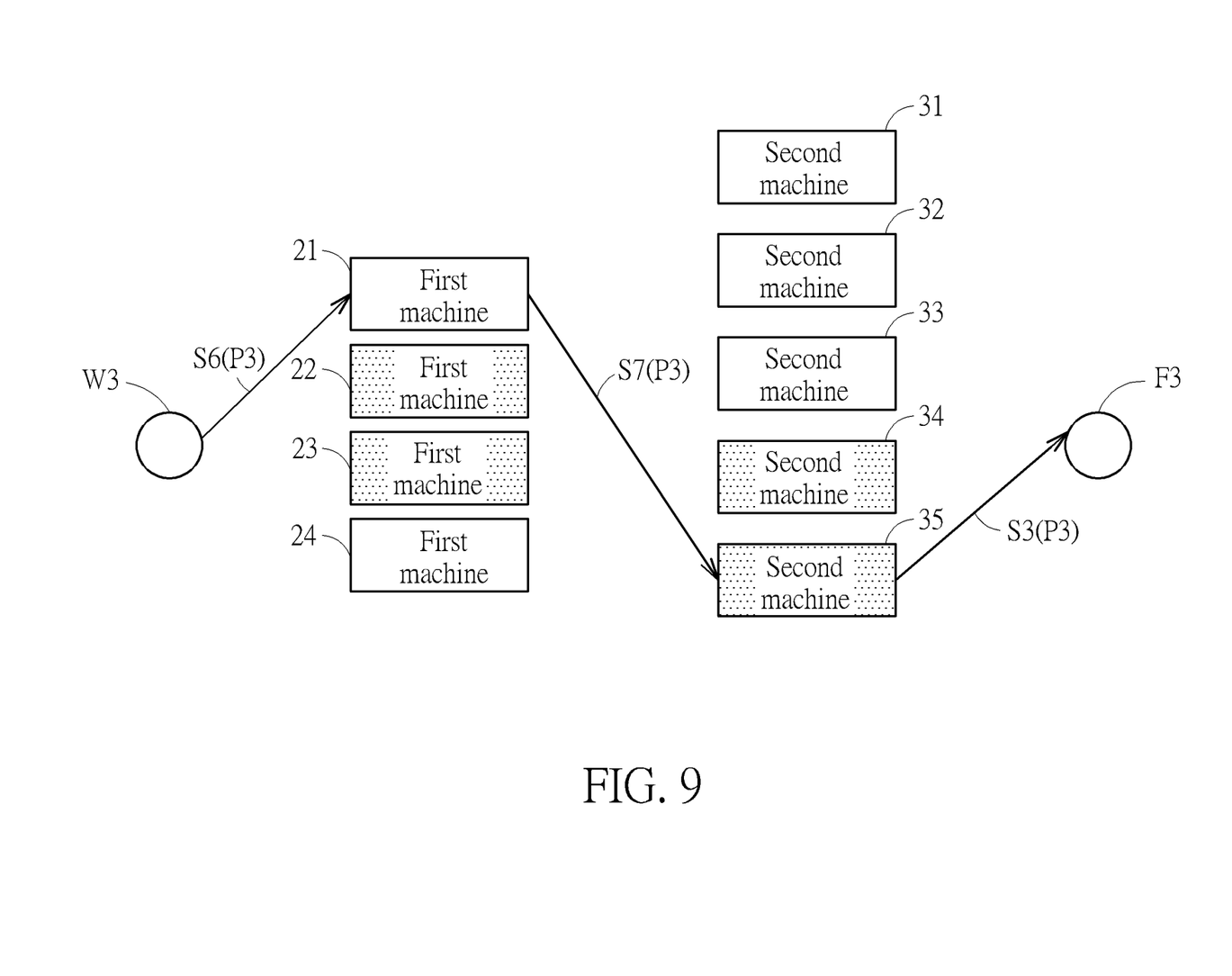
FIG. 9 is a schematic diagram of a third process path according to one embodiment of the present disclosure.

Please refer to FIG. 9, which is a schematic diagram of a third process path P3 according to one embodiment of the present disclosure. Herein, FIG. 9 is used to illustrate Steps 610-640 in FIG. 8, which is exemplary and the present disclosure is not limited thereto. The control module 10 performs Step 610 to designate one of the low-risk first machines 21 and 24 as the selected low-risk first machine. Herein, the first machine 21 is exemplarily designated as the selected low-risk first machine. The control module 10 performs Step 620 to sort the first machine 21 and the second machine 35 to establish the third process path P3. Herein the third process path P3 is first to process with the first machine 21 and then to process with the second machine 35. The control module 10 performs Step 630 to assign another object W3 to be processed by the first process and the second process according to the third process path P3, so as to obtain another processed object F3. That is, the third process path P3 includes the path formed by Arrow S6, Arrow S7 and Arrow S3. The control module 10 performs Step 640 to determine whether to continue or stop to use the second machine 35 according to the test result of the another processed object F3. Specifically, the third process path P3 includes the first machine 21 with lower risk and the second machine 35 with higher risk. When the test result of the processed object F3 is qualified, it means that both the first machine 21 and the second machine 35 are not abnormal. Thus, the control module 10 can determine to continue to use the second machine 35. In addition, it can be exclude the possibility that the abnormality of the first process path P1 in FIG. 5 is caused by the second machine 35. In other words, it can be deduced that the abnormality of the first process path P1 in FIG. 5 is likely caused by the first machine 22. At this time, the control module 10 can determine to stop to use the first machine 22, or to perform Steps 510-540 in FIG. 6 to further confirm whether the first machine 22 is abnormal. When the test result of the processed object F3 is unqualified, it shows that the second machine 35 is likely abnormal because the first machine 21 has a lower risk. The control module 10 can determine to stop to use the second machine 35. In addition, the second machine 35 being regarded as abnormal cannot exclude the abnormality of the first machine 22, and Steps 510-540 in FIG. 6 are still required to be performed for further confirming whether the first machine 22 is abnormal.

In FIG. 1, the machine monitoring system 1 includes one type of machine (i.e., the first machines 21-24). In FIG. 3, the machine monitoring system 2 includes two types of machines (i.e., the first machines 21-24 and the s second machines 31-35). However, the present disclosure is not limited thereto, and the types of machines can be increased according to the production requirements of actual products. For example, when the machine monitoring system further includes a plurality of third machines, the control module 10 can define each of the third machines as a high-risk third machine or a low-risk third machine according to a third risk score of each of the third machines, and designate one of the high-risk third machine as a selected high-risk third machine. Moreover, Step 460 can be change to establish the first process path by sorting the selected high-risk first machine, the selected high-risk second machine and the selected high-risk third machine. Step 465 can be change to assign an object to be processed by the first process, the second process and the third process according to the first process path to obtain a processed object. Then the following Step 470 is performed. When the machine monitoring system further includes a plurality of fourth machines, it can be deduced by analogy.

Compared with the prior art, the present disclosure is beneficial to monitor the machines with higher risk by giving priority to use the machines with higher risk to perform the process, and is beneficial to detect the abnormality of the machine with higher risk at the first time. Accordingly, it can avoid from using the machine to produce unqualified products when the machine is abnormal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A machine monitoring system, comprising:
   a plurality of first machines for a first process;
   a plurality of second machines for a second process; and
   a control module connected with the first machines and the second machines, wherein the control module is configured to:
   define each of the first machines as a high-risk first machine or a low-risk first machine according to a first risk score of each of the first machines;
   define each of the second machines as a high-risk second machine or a low-risk second machine according to a second risk score of each of the second machines;
   designate one of the first machines being defined as the high-risk first machine as a selected high-risk first machine;
   designate one of the second machines being defined as the high-risk second machine as a selected high-risk second machine;
   establish a first process path by sorting the selected high-risk first machine and the selected high-risk second machine;
   assign an object to be processed by the first process through the selected high-risk first machine and the second process according to the first process path to obtain a processed object; and
   determine whether to continue or stop to use the selected high-risk first machine and the first process path according to a test result of the processed object.

2. The machine monitoring system of claim 1, wherein the control module is further configured to:
   calculate the first risk score of each of the first machines based on a data of each of the first machines.

3. The machine monitoring system of claim 2, wherein the control module comprises:
   a computing unit configured to calculate the first risk score of each of the first machines based on the data of each of the first machines and designate the selected high-risk first machine; and
   a command unit connected with the computing unit, wherein the command unit is configured to assign the object to be processed by the first process through the selected high-risk first machine to obtain the processed object.

4. The machine monitoring system of claim 2, wherein the data of each of the first machines comprise a selected frequency, an estimated remaining life time, parameters, abnormal data, an offline impurity detection result and/or a design complexity of each of the first machines.

5. The machine monitoring system of claim 4, further comprising:
   a parameter detection module connected with the first machines and the control module, wherein the parameter detection module is configured to collect the parameters of each of the first machines; and
   a fault detection classification module connected with the first machines and the control module, wherein the fault detection classification unit is configured to collect the abnormal data of each of the first machines.

6. The machine monitoring system of claim 1, further comprising:
   a test module connected with the control module, wherein the test module is configured to test a property of the processed object to obtained the test result of the processed object.

7. The machine monitoring system of claim 1, wherein when the control module determines to stop to use the first process path, the control module is further configured to:
   designate one of the second machines being defined as the low-risk second machine as a selected low-risk second machine;
   sort the selected high-risk first machine and the selected low-risk second machine to establish a second process path;
   assign another object to be processed by the first process and the second process according to the second process path to obtain another processed object; and
   determine whether to continue or stop to use the selected high-risk first machine according to the test result of the another processed object.

8. The machine monitoring system of claim 1, wherein when the control module determines to stop to use the first process path, the control module is further configured to:
   designate one of the first machines being defined as the low-risk first machine as a selected low-risk first machine;

sort the selected low-risk first machine and the selected high-risk second machine to establish a third process path;

assign another object to be processed by the first process and the second process according to the third process path to obtain another processed object; and determine whether to continue or stop to use the selected high-risk second machine according to the test result of the another processed object.

9. The machine monitoring system of claim 1, wherein the first process is a semiconductor process.

10. The machine monitoring system of claim 1, wherein the test result comprises a number of impurities or defects on a surface of the processed object.

11. A machine monitoring method for monitoring a plurality of first machines for a first process and a plurality of second machines for a second process, the machine monitoring method comprising:

defining each of the first machines as a high-risk first machine or a low-risk first machine according to a first risk score of each of the first machines;

defining each of the second machines as a high-risk second machine or a low-risk second machine according to a second risk score of each of the second machines;

designating one of the first machines being defined as the high-risk first machine as a selected high-risk first machine;

designating one of the second machines being defined as the high-risk second machine as a selected high-risk second machine;

establishing a first process path by sorting the selected high-risk first machine and the selected high-risk second machine;

assigning an object to be processed by the first process through the selected high-risk first machine and the second process according to the first process path to obtain a processed object; and determining whether to continue or stop to use the selected high-risk first machine and the first process path according to a test result of the processed object.

12. The machine monitoring method of claim 11, further comprising:

calculating the first risk score of each of the first machines according to a data of each of the first machines.

13. The machine monitoring method of claim 12, wherein the data of each of the first machines comprises a selected frequency, an estimated remaining life time, parameters, abnormal data, an offline impurity detection result and/or a design complexity of each of the first machines.

14. The machine monitoring method of claim 13, further comprising:

collecting the parameters of each of the first machines; and collecting the abnormal data of each of the first machines.

15. The machine monitoring method of claim 11, wherein when the control module determines to stop to use the first process path, the machine monitoring method further comprises:

designating one of the second machines being defined as the low-risk second machine as a selected low-risk second machine;

sorting the selected high-risk first machine and the selected low-risk second machine to establish a second process path;

assigning another object to be processed by the first process and the second process according to the second process path to obtain another processed object; and determining whether to continue or stop to use the selected high-risk first machine according to the test result of the another processed object.

16. The machine monitoring method of claim 11, wherein when the control module determines to stop to use the first process path, the machine monitoring method further comprises:

designating one of the first machines being defined as the low-risk first machine as a selected low-risk first machine;

sorting the selected low-risk first machine and the selected high-risk second machine to establish a third process path;

assigning another object to be processed by the first process and the second process according to the third process path to obtain another processed object; and determining whether to continue or stop to use the selected high-risk second machine according to the test result of the another processed object.

17. The machine monitoring method of claim 11, wherein the first process is a semiconductor process.

18. The machine monitoring method of claim 11, wherein the test result comprises a number of impurities or defects on a surface of the processed object.

* * * * *